United States Patent
Kato et al.

(10) Patent No.: US 9,508,994 B2
(45) Date of Patent: Nov. 29, 2016

(54) CURRENT COLLECTOR, ELECTRODE STRUCTURE, NONAQUEOUS ELECTROLYTE BATTERY AND ELECTRICAL STORAGE DEVICE, AND METHOD FOR PRODUCING CURRENT COLLECTOR

(71) Applicants: UACJ Corporation, Chiyoda-ku, Tokyo (JP); UACJ Foil Corporation, Chuo-kuo, Tokyo (JP)

(72) Inventors: Osamu Kato, Chiyoda-ku (JP); Sohei Saito, Chiyoda-ku (JP); Yukiou Honkawa, Chiyoda-ku (JP); Mitsuyuki Wasamoto, Kusatsu (JP); Tsugio Kataoka, Kusatsu (JP); Satoshi Yamabe, Kusatsu (JP)

(73) Assignees: UACJ CORPORATION, Tokyo (JP); UACJ FOIL CORPORATION, Tokyo (JP)

(*) Notice: Subject to any disclaimer, the term of this patent is extended or adjusted under 35 U.S.C. 154(b) by 110 days.

(21) Appl. No.: 14/397,115
(22) PCT Filed: May 10, 2013
(86) PCT No.: PCT/JP2013/063129
§ 371 (c)(1),
(2) Date: Oct. 24, 2014
(87) PCT Pub. No.: WO2013/172256
PCT Pub. Date: Nov. 21, 2013

(65) Prior Publication Data
US 2015/0125757 A1 May 7, 2015

(30) Foreign Application Priority Data
May 15, 2012 (JP) ................................. 2012-111112

(51) Int. Cl.
H01M 4/66 (2006.01)
H01M 4/82 (2006.01)
(Continued)

(52) U.S. Cl.
CPC ............. *H01M 4/667* (2013.01); *H01G 11/28* (2013.01); *H01G 11/70* (2013.01); *H01M 4/661* (2013.01);
(Continued)

(58) Field of Classification Search
CPC ... H01G 11/28; H01G 11/70; H01M 10/052; H01M 4/661; H01M 4/663; H01M 4/666; H01M 4/667; H01M 4/668; H01M 4/82; Y02E 60/13; Y02P 70/54
See application file for complete search history.

(56) References Cited

U.S. PATENT DOCUMENTS

| 5,792,553 A | 8/1998 | Moriyama |
| 2011/0111191 A1 | 5/2011 | Lee |

(Continued)

FOREIGN PATENT DOCUMENTS

| JP | 07-006684 A | 1/1995 |
| JP | 10-270084 A | 10/1998 |

(Continued)

OTHER PUBLICATIONS

Extended European Search Report mailed Dec. 10, 2015, issued in corresponding International Application No. PCT/JP2013/063129, filed May 10, 2013, 9 pages.
(Continued)

*Primary Examiner* — Carlos Barcena
(74) *Attorney, Agent, or Firm* — Christensen O'Connor Johnson Kindness PLLC

(57) ABSTRACT

A current collector, an electrode structure, a non-aqueous electrolyte battery, and an electrical storage device capable of providing superior shut down function are provided. According to the present invention, a current collector having a resin layer on at least one side of a conductive substrate, wherein: the resin layer has a thermoplastic resin dispersed in a thermosetting resin base material, the thermoplastic resin encapsuling a conductive agent; a value given by (average thickness of the conductive agent)/(average thickness of the thermoplastic resin) is 0.5 to 3; the conductive agent is formulated so that a value of volume % given by (conductive agent)/(conductive agent+thermoplastic resin) is 10 to 50%; and formulation ratio of the thermoplastic resin is 10 to 65%, is provided.

9 Claims, 2 Drawing Sheets

(51) Int. Cl.
*H01G 11/28* (2013.01)
*H01G 11/70* (2013.01)
*H01M 10/052* (2010.01)

(52) U.S. Cl.
CPC ............. *H01M 4/666* (2013.01); *H01M 4/668* (2013.01); *H01M 4/82* (2013.01); *H01M 4/663* (2013.01); *H01M 10/052* (2013.01); *Y02E 60/13* (2013.01)

(56) References Cited

U.S. PATENT DOCUMENTS

2013/0295432 A1* 11/2013 Inoue .................... H01M 4/668
429/149

2014/0065491 A1* 3/2014 Yokouchi .............. H01M 4/661
429/332

FOREIGN PATENT DOCUMENTS

| JP | 2001-357854 A | 12/2001 |
|---|---|---|
| JP | 2005-123185 A | 5/2005 |

OTHER PUBLICATIONS

International Search Report mailed Jul. 30, 2013, issued in corresponding International Application No. PCT/JP2013/063129, filed May 10, 2013, 2 pages.

* cited by examiner

CURRENT COLLECTOR, ELECTRODE STRUCTURE, NONAQUEOUS ELECTROLYTE BATTERY AND ELECTRICAL STORAGE DEVICE, AND METHOD FOR PRODUCING CURRENT COLLECTOR

TECHNICAL FIELD

The present invention relates to current collectors, electrode structures, non-aqueous electrolyte batteries, and electrical storage devices (electrical double layer capacitors, lithium ion capacitors, and the like) having high safety; and manufacturing method thereof.

BACKGROUND

Regarding lithium ion batteries in the vehicle and the like, a property (so-called a shut down function) to automatically and safely terminate discharge and charge of the battery when an accident such as malfunction occurs, has been required. In the battery, the separator is provided with such property. Usually, the separator is designed so that when the temperature is approximately 110 to 140° C., the separator fuses to block micropores, thereby blocking Li ions, leading to termination of the electrode reaction under over-heated circumstances. However, there are cases where the shut down by the separator is incomplete and thus the temperature increases to above the melting point of the separator, and cases where the temperature increase in the external surroundings result in the meltdown of the separator. Such cases would result in an internal short-circuit. Then, the shut down function of the separator can no longer be counted on, and the battery would be in the state of thermal runaway. In order to deal with such circumstances, a technique to form a positive temperature coefficient resistor on the current collector has been suggested.

For example, as a technique to form the positive temperature coefficient resistor on the current collector, Patent Literature 1 discloses a technique in which the surface of the current collector is coated with a conductive layer comprising a crystalline thermoplastic resin having a function as the positive temperature coefficient resistor, a conductive agent, and a binding agent. Here, the function as the positive temperature coefficient resistor is the function where the resistance value increases along with the increase in temperature. According to such technique, when the temperature inside the battery reaches the melting point of the crystalline thermoplastic resin by the heat generated due to the overcharge of the battery, the resistance of the conductive layer rises sharply, thereby cutting off the current which is flowing through the current collectors to realize the shut down function.

In addition, in Patent Literature 2, a technique to embed conductive fillers in PTC powders having a resistance value which increase along with the increase in temperature, and the arranging the PTC powders in the positive electrode material layer, is disclosed.

In Patent Literature 3, a technique to arrange thermally expandable microcapsules in between electrodes is disclosed. Here, when the microcapsules expand, the conductive path is cut down, thereby achieving a function as a fuse.

In Patent Literature 4, a technique to adhere microcapsules including a substance which inhibits battery reaction onto the surface of the electrode is disclosed. When the microcapsules melt by the increase in temperature, the substance included would be released, thereby achieving a function as a fuse.

CITATION LIST

Patent Literature

Patent Literature 1: JP 2001-357854A
Patent Literature 2: JP 2005-123185A
Patent Literature 3: JP H7-6684A
Patent Literature 4: JP H10-270084A

SUMMARY OF THE INVENTION

Technical Problem

The technique disclosed in Patent Literature 1 can realize the shut down function to some extent; however, it is still insufficient for practical use. Accordingly, enhancement of the shut down function is desired.

In the technique disclosed in Patent Literature 2, PTC powders are arranged in the base material containing conductive agent. Therefore, even when the resistance of PTC powders increase due to the increase in the temperature, there may be a case where the conductive pathway does not shut down fully.

In the technique disclosed in Patent Literature 3, microcapsules are arranged in the base material containing conductive agent. Therefore, even when the microcapsules expand due to the increase in the temperature, there may be a case where the conductive pathway does not shut down fully.

In the technique disclosed in Patent Literature 4, microcapsules cannot be re-used, once they are melt. Therefore, it is practically inconvenient.

The present invention has been made by taking the afore-mentioned circumstances into consideration. An object of the present invention is to provide current collectors, electrode structures, non-aqueous electrolyte batteries, and electrical storage devices having a shut down function with high safety, and a manufacturing method of the current collector.

Solution to Problem

By using current collectors described hereinafter, non-aqueous electrolyte batteries and electrical storage devices having superior shut down function can be obtained.

That is, according to the present invention, a current collector having a resin layer on at least one side of a conductive substrate, wherein:

the resin layer has a thermoplastic resin dispersed in a thermosetting resin base material, the thermoplastic resin encapsuling a conductive agent;

a value given by (average thickness of the conductive agent)/(average thickness of the thermoplastic resin) is 0.5 to 3;

the conductive agent is formulated so that a value of volume % given by (conductive agent)/(conductive agent+ thermoplastic resin) is 10 to 50%; and formulation ratio of the thermoplastic resin is 10 to 65%, is provided.

In order to achieve the shut down function in the non-aqueous electrolyte batteries and the like, the present inventors have conducted extensive studies. However, none of the conventional techniques were able to achieve sufficient performance. Accordingly, the inventors have sought for its cause, and found that all of the various conventional techniques had the conductive agent dispersed uniformly in the resin layer, and thus thermal expansion of the microcapsule provided only partial cut off of the conductive pathway, resulting in inadequate shut down function. Then, in such circumstances, the inventors have conceived of structuring the resin layer with a thermosetting resin base material and a thermoplastic resin dispersed therein, and encapsule the conductive agent in the thermoplastic resin. By actually testing such structure, it became evident that when the thickness and the formulation amount of the conductive agent and the thermoplastic resin were appropriately adjusted, the thermoplastic resin would expand in accordance with the rise in the temperature, thereby dividing the conductive agent in the thermoplastic resin and providing insulating property. Accordingly, the shut down function can be achieved certainly, leading to completion of the present invention.

Hereinafter, various embodiments of the present invention will be exemplified. The embodiments shown hereinafter can be combined with each other.

Preferably, the thermoplastic resin has a melting point of 50° C. or higher and 200° C. or lower.

Preferably, a value given by (average thickness of the thermoplastic resin)/(average thickness of the thermosetting resin base material) is 0.9 to 3.5.

Preferably, the thermoplastic resin is at least one selected from the group consisting of a polyethylene-based resin, a polypropylene-based resin, a polyvinylidene fluoride-based resin, a polyvinyl butyral-based resin, and modified resins thereof.

Preferably, the conductive agent comprises carbon black.

Preferably, the thermosetting resin base material is formed with a composition comprising a thermosetting resin and a hardening agent, and the thermosetting resin is a mixture or a copolymer comprising at least one type selected from the group consisting of a polyacrylic acid-based resin, a nitrocellulose-based resin, and a chitosan-based resin.

According to another aspect of the present invention, an electrode structure comprising an active material layer or an electrode material layer on the resin layer of the aforementioned current collector, and a non-aqueous electrolyte battery or an electrical storage device comprising the electrode structure, are provided.

According to further another aspect of the present invention, a method for manufacturing a current collector, comprising the steps of: applying a resin layer material on at least one side of a conductive substrate; and baking the resin layer material at 120 to 230° C.; wherein the resin layer material is obtained by emulsifying a thermoplastic resin solution in a thermosetting resin solution, the thermoplastic resin solution having a thermoplastic resin and a conductive agent dispersed or dissolved in an organic solvent, and the thermosetting resin solution having a thermosetting resin and a hardening agent dispersed or dissolved in water, is provided.

DESCRIPTION OF EMBODIMENTS

1. Current Collector

Hereinafter, the current collector according to one embodiment of the present invention will be described with reference to FIG. 1 to FIG. 4.

Figure 1:
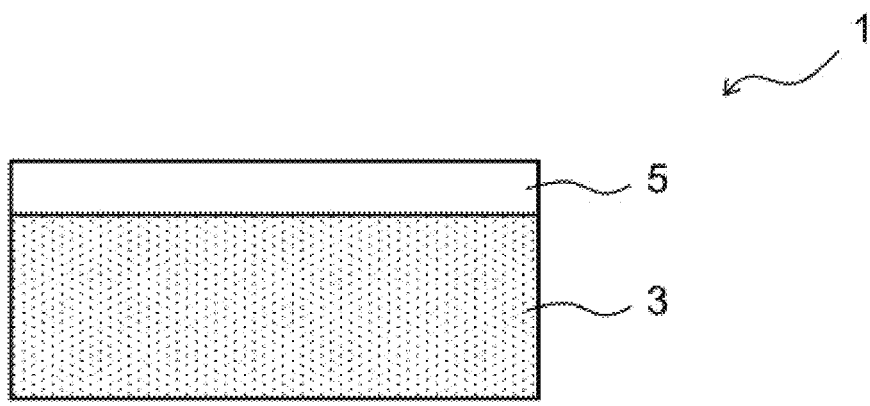
FIG. 1 is a cross-sectional view showing a structure of the current collector according to one embodiment of the present invention.
Figure 2:
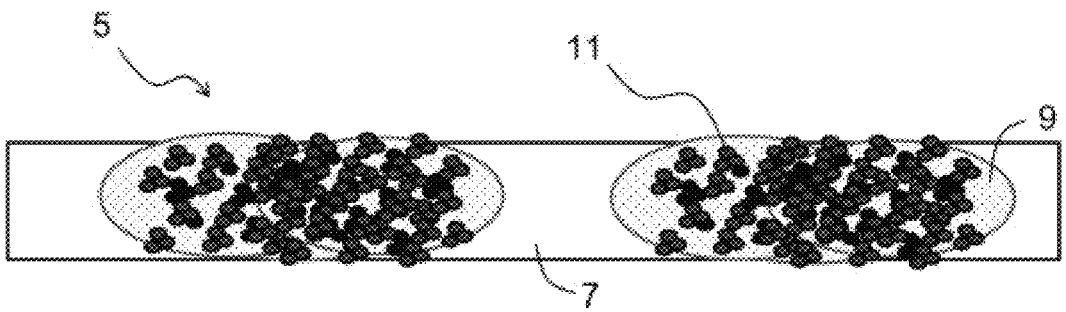
FIG. 2 is a cross-sectional view showing a precise structure of the resin layer of the current collector at ambient temperature according to one embodiment of the present invention.

As shown in FIG. 1 to FIG. 2, the current collector 1 of the present invention is structured by providing a resin layer having conductivity (resin layer for current collector) 5 on at least one side of the conductive substrate 3. The thermoplastic resin 9 encapsuling the conductive agent 11 is dispersed in the thermosetting resin base material 7 to give the resin layer 5.

Figure 3:
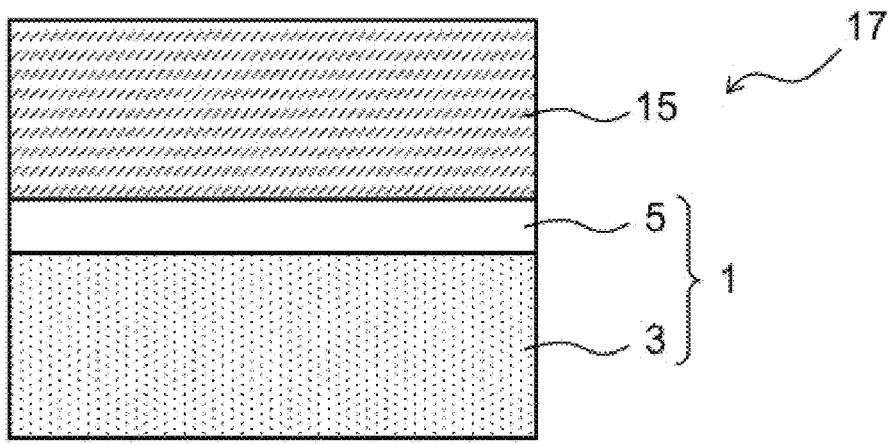
FIG. 3 is a cross-sectional view showing a structure of the electrode structure structured by using the current collector according to one embodiment of the present invention.

As shown in FIG. 3. an active material layer or an electrode material layer 15 can be formed on the resin layer 5 of the current collector 1 of the present invention to give an electrode structure 17 suitable for usage in a non-aqueous electrolyte battery such as the lithium ion battery, an electrical double layer capacitor, or lithium ion capacitor.

Hereinafter, each of the components will be described in detail.

(1) Conductive Substrate

As the conductive substrate of the present invention, various types of metal foils for the usage in non-aqueous electrolyte batteries, electrical double layer capacitors, or lithium ion capacitors can be used. Specifically, various metal foils for positive electrodes and negative electrodes, such as foils of aluminum, aluminum alloy, copper, stainless steel, nickel and the like can be used for example. Among these, from the viewpoint of the balance between high electrical conductivity and cost, aluminum, aluminum alloy, and copper are preferable. There is no particular limitation with respect to the thickness of the conductive substrate. Here, it is preferable that the thickness is 5 µm or more and 50 µm or less. When the thickness is less than 5 µm, the strength of the foil would be insufficient, and thus it becomes difficult to form the resin layer and the like. When the thickness exceeds 50 µm, the other components, particularly the active material layer or the electrode material layer need be thinned. In particular, when non-aqueous electrolyte batteries and electrical storage devices such as electrical double layer capacitors or lithium ion capacitors are being made, the active material layer need be thinned, thereby leading to cases where the capacity becomes insufficient.

(2) Resin Layer

In the present invention, the resin layer 5 is formed on the conductive substrate 3. Regarding the usage as the positive electrode, it is preferable that the resin layer 5 of the present invention is structured separately from the active material layer. As such, the adhesion between the conductive substrate and the active material layer can be improved. In addition, the shut down function can be obtained, and thus the current collector can suitably be used in the manufacture of the non-aqueous electrolyte battery, electrical storage device and the like having superior safety.

The resin layer 5 of the present invention is made by dispersing the thermoplastic resin 9 in the thermosetting resin base material 7, the thermoplastic resin 9 encapsuling the conductive agent 11.

There is no particular limitation regarding the thickness of the resin layer 5. Here, the thickness is preferably 0.3 to 20 μm. When the thickness is less than 0.3 μm, the resistance cannot be increased sufficiently at over-heated circumstances, resulting in cases where the shut down function is not achieved. When the thickness exceeds 20 μm, the resistance at normal circumstances would become high, resulting in the decrease of high-rate characteristics. Examples of the thickness of the resin layer 5 are 0.3, 0.5, 1, 2, 5, 10, 15, and 20 μm, and may be in the range of two values selected from the values exemplified herein.

<Thermosetting Resin Base Material>

The thermosetting resin base material 7 can be formed by heating a composition containing a thermosetting resin and a hardening agent, thereby hardening the composition. There is no particular limitation for the thermosetting resin, so long as it hardens when allowed to react with a hardening agent. Examples of the thermosetting resin include a mixture or a copolymer containing at least one type among a polyacrylic acid-based resin, a nitrocellulose-based resin, and a chitosan-based resin. One example is a polyacrylic acid-polyacrylic acid ester copolymer.

In the present invention, the polyacrylic acid-based resin is a resin formed from monomers containing acrylic acid, methacrylic acid, or derivatives thereof as the main component. Specific examples include a mixture or a copolymer containing at least one type among a polyacrylic acid, a polyacrylic acid ester, a polymethacrylic acid, and a polymethacrylic acid ester.

In the present invention, the nitrocellulose-based resin is a resin containing nitrocellulose as the resin component. Here, it may contain only the nitrocellulose, or may contain a resin other than the nitrocellulose. The nitrocellulose is one type of cellulose which is a polysaccharide, and is characterized by possessing a nitro group. Although nitrocellulose is cellulose having a nitro group, in contrast with other celluloses such as CMC and the like, the nitro celluloses is not widely used in electrodes, and have been conventionally used as a raw material of resin film or coatings. The Nitrogen density of the soluble nitrocellulose used in the present invention is 10 to 13%, especially preferably 10.5 to 12.5%. When the Nitrogen density is too low, dispersion may not be sufficient depending on the type of conductive material. When the Nitrogen density is too high, the soluble nitrocellulose becomes chemically unstable, which would be dangerous when used for batteries. The Nitrogen density depends on the number of nitro group, and thus the Nitrogen density can be adjusted by adjusting the number of the nitro group. In addition, the viscosity of the soluble nitrocellulose is usually in the range of 1 to 6.5 second, preferably 1.0 to 6 seconds when observed by JIS K-6703. The acid content is preferably 0.006% or lower, especially preferably 0.005% or lower. When these values are not in such range, dispersibility of the conductive material and the battery characteristics may degrade.

In the present invention, the chitosan-based resin is a resin including a chitosan derivative as the resin component. As the chitosan-based resin, a resin including a chitosan derivative by 100 mass % can be used, however, other resin component can be used in combination. When the other resin is used in combination, it is preferable that the chitosan derivative is contained by 50 mass % or higher, more preferably 80 mass % or higher with respect to the total resin component. Examples of the chitosan derivative include hydroxy alkyl chitosan, specifically hydroxyl ethyl chitosan, hydoroxy propyl chitosan, hydroxyl butyl chitosan, and grycerylated chitosan, and grycerylated chitosan is particularly preferable. The chitosan-based resin preferably contains an organic acid. As the organic acid, pyromellitic acid, terephthalic acid and the like can be mentioned. The amount of the organic acid added is preferably 20 to 300 mass % with respect to 100 mass % of the chitosan derivative, and is more preferably 50 to 150 mass %. When the amount of organic acid added is too small, the hardening of the chitosan derivative becomes insufficient. When the amount of organic acid added is too large, flexibility of the resin layer decreases.

There is no particular limitation for the type of the hardening agent, so long as it can harden the thermosetting resin by cross-linking. For example, melamine or derivatives thereof, blocked urea and the like can be mentioned. Derivatives of melamine can be obtained by forming a methylol group via condensation reaction of melamine and formaldehyde (further addition reaction may be carried out for obtaining polynuclear compounds), and then alkylating the methylol group with alcohol (example: methyl alcohol or butyl alcohol) as necessary. As the derivatives of melamine, a fully-alkylated type having almost all of its methylol group alkylated, an imino-type having many remaining hydrogen groups that are not converted into methylol groups, and a methylol type having many methylol groups that are not alkylated, can be mentioned for example. In the present invention, it is preferable to use the fully-alkylated type melamine. The fully-alkylated melamine does not have a methylol group or an imino group, but has methylol groups that are completely etherified generally with C1 to C4 mono-valent alcohols, such as methanol, n-butanol, isobutanol and the like. The average degree of condensation of the fully-alkylated melamine is 2 or lower. When the fully-alkylated melamine is used, flexibility of the resin layer 5 can be improved, and the adhesion with the active material layer after pressing can be improved. Specific examples of the derivative of melamine are trimethoxy methyl melamine and hexamethoxy methyl melamine. Blocked urea can be obtained by first preparing a methylol urea by condensation reaction of urea with formaldehyde, and then allowing the resulting methylol compound to react with a blocking agent such as alcohol (example: methyl alcohol or butyl alcohol).

<Thermoplastic Resin>

Figure 4:
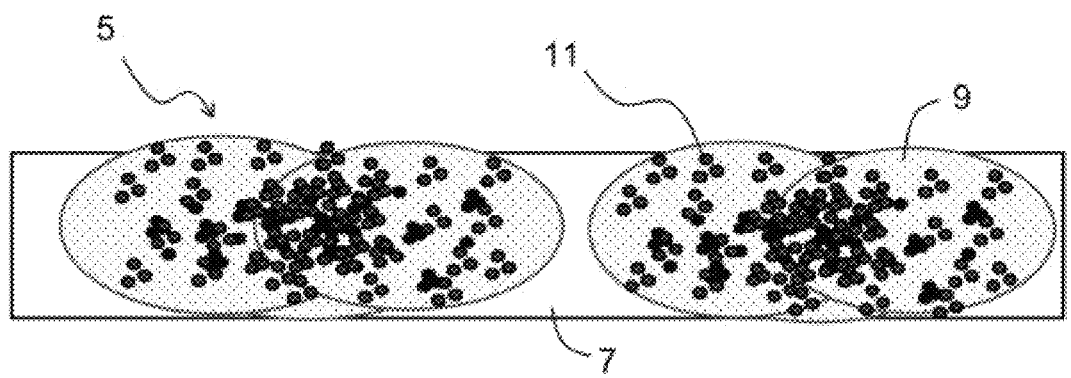
FIG. 4 is a cross-sectional view showing a precise structure of the resin layer of the current collector at elevated temperature according to one embodiment of the present invention.
Figure 5:
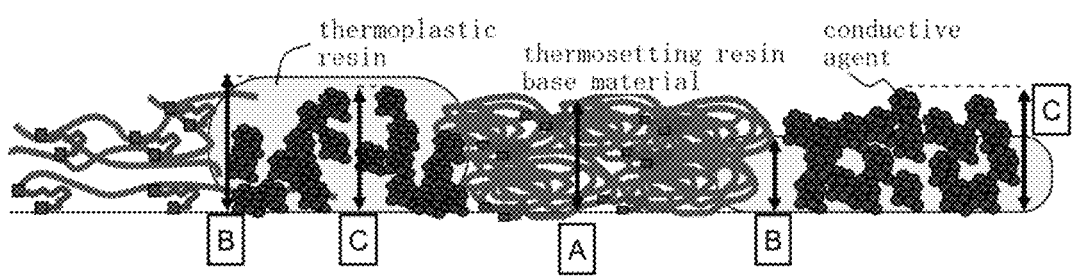
FIG. 5 is a cross-sectional view for explaining the method for measuring the thickness of the thermosetting resin base material, thermoplastic resin, and conductive agent in the Examples of the present invention.

The thermoplastic resin 9 encapsules the conductive agent 11, and is dispersed in the thermosetting resin base material 7. At ambient temperature, as shown in FIG. 2, the particles of the conductive agent 11 come in contact with each other in the thermoplastic resin 9 penetrating the resin layer. Accordingly, conduction between the two major surfaces of the resin layer 5 can be achieved, resulting in low resistance. The conductive agent 11 is not dispersed in the entirety of the resin layer 5, and is substantially dispersed only in the thermoplastic resin 9. Therefore, the conductive pathway is limited compared with the conventional technique where the conductive agent 11 is dispersed in the entirety of the resin layer. At elevated temperature, as shown in FIG. 4, the thermoplastic resin 9 expands by heat, resulting in the increase in volume. Since the conductive agent 11 comprising carbon black and the like hardly expand, the expansion of the thermoplastic resin 9 would increase the distance between the particles of conductive agent 11 in the thermoplastic resin 9. Then, the particles of the conductive agent 11 would no longer be in contact with each other, thereby cutting the conductive pathway. In the conventional technique, there are many conductive pathways. On the other hand, in the present invention, the conductive agent 11 is dispersed only in the thermoplastic resin 9, allowing conduction only in the limited conductive pathway. Therefore, the thermal expansion of the thermoplastic resin would substantially cut all of the conductive pathways, achieving effective shut down function.

The size of the thermoplastic resin 9 is not particularly limited. Here, the value given by (average thickness of the thermoplastic resin 9)/(average thickness of the thermosetting resin base material 7) is preferably 0.9 to 3.5. When this value is too small, the thermoplastic resin 9 containing the conductive agent 11 would be embedded in the thermosetting resin base material 7. This would raise the initial electrical resistance, and is thus unfavorable. When this value is too large, it becomes difficult to maintain the thermoplastic resin 9 in the thermosetting resin base material 7, and tends to suffer defects such as detachment during the application of the active material paste. Examples of the specific values are, 0.9, 1.0, 1.5, 2.0, 2.5, 3.0, and 3.5, and may be in the range of two values selected from the values exemplified herein.

The ratio of the thermoplastic resin is defined as (volume of the thermoplastic resin+volume of the conductive agent)/(volume of the thermoplastic resin+volume of the conductive agent+volume of the thermosetting resin+volume of the hardening agent), and is 10 to 65%. When such ratio is too small, there would be less conductive pathway, raising the electrical resistance at ambient temperature. On the other hand, when such ratio is too large, the area of the thermosetting resin would become small, resulting in insufficient adhesion of the coating and decrease in solvent resistance. Examples of the ratio are, 10, 15, 20, 25, 30, 35, 40, 45, 50, 55, 60, and 65%, and may be in the range of two values selected from the values exemplified herein.

The thermoplastic resin 9 of the present invention is not particularly limited, so long as it can achieve the shut down function by heat expansion with the afore-mentioned principle. Here, the thermoplastic resin comprises one or more type of resin selected from the group consisting of polyethylene-based resin, polypropylene-based resin, polyvinylidene fluoride-based resin, polyvinyl butyral-based resin, and modified resins thereof. The melting point of the thermoplastic resin 9 is not particularly limited. Here the melting point is preferably 50° C. or higher and 200° C. or lower. When the melting point is too low, the conductive agent 11 would not be maintained in the thermoplastic resin 9 during the formation of the thermosetting resin base material 7, which involves heat hardening of the composition containing the thermosetting resin and the hardening agent. Then, the conductive agent would be spread into the thermosetting resin base material 7, making it difficult to achieve the shut down function. On the other hand, when the melting point is too high, the thermoplastic resin 9 and the conductive agent 11 would not fuse, which would result in a condition where the thermoplastic resin 9 and the conductive agent 11 are just placed adjacently to be dispersed in the thermosetting resin base material 7. Then, the conductive agent 11 would not apart even when the thermoplastic resin 9 expand, thereby resulting in cases where the shut down function is not achieved. Specific examples of the melting point of the thermoplastic resin 9 are 50, 60, 70, 80, 90, 100, 110, 120, 130, 140, 150, 160, 170, 180, 190, and 200° C., and may be in the range of two values selected from the values exemplified herein.

<Conductive Agent>

As the conductive agent 11 used in the present invention, known carbon powders, metal powders and the like can be used. Among them, carbon black such as furnace black, acetylene black, Ketjen black and the like are preferable. The average thickness of the conductive agent 11 is not particularly limited. Here, the value given by (average thickness of the conductive agent 11)/(average thickness of the thermoplastic resin 9) is 0.5 to 3. When this value is too small, it would become difficult for the particles of the conductive agent 11 to come in contact with each other in the thermoplastic resin 9, resulting in increase in the resistance of the resin layer 5 at ambient temperature. On the other hand, when this value is too large, it becomes difficult for the particles of the conductive agent 11 in the thermoplastic resin 9 to apart from each other even at elevated temperature, making it difficult to achieve the shut down function. Examples of the value are, 0.5, 1, 1.5, 2, 2.5, and 3, and may be in the range of two values selected from the values exemplified herein.

The average thickness of the conductive agent 11 is obtained in the following manner. Using an image obtained by SEM observation of the cross section of the resin layer 5, the length in the vertical direction with respect to the resin layer surface is measured for 10 points where the conductive agent 11 is aggregated continuously from the conductive substrate to the surface of the resin layer 5. Then, the average of the length measured for the 10 points is calculated.

The formulation amount of the conductive agent 11 is not particularly limited. Here, the conductive agent 11 is formulated so that the value of volume % given by (conductive agent)/(conductive agent+thermoplastic resin) is 10 to 50%. When the formulation amount of the conductive agent 11 is too small, the number of contacting points of the conductive agent 11 would be small, resulting in high electrical resistance at ambient temperature. On the other hand, when the formulation amount of the conductive agent 11 is too large, the conductive agent 11 would be still in contact with each other even at elevated temperature, making it difficult to achieve the shut down function. Examples of the value are, 10, 15, 20, 25, 30, 35, 40, 45, and 50%, and may be in the range of two values selected from the values exemplified herein.

2. Manufacturing Method of Current Collector

The manufacturing method of the current collector of the present invention comprises the steps of: applying a resin layer material on at least one side of a conductive substrate 3; and baking the resin layer material at 120 to 230° C.; wherein the resin layer material is obtained by emulsifying a thermoplastic resin solution in a thermosetting resin solution, the thermoplastic resin solution having a thermoplastic resin and a conductive agent dispersed or dissolved in an organic solvent, and the thermosetting resin solution having a thermosetting resin and a hardening agent dispersed or dissolved in water.

Hereinafter, details are provided.

First, a thermoplastic resin solution is prepared by dispersing or dissolving the thermoplastic resin and the conductive agent in an organic solvent. Subsequently, the thermoplastic resin solution thus obtained is added to an aqueous solution containing a surfactant, and then the mixture is agitated. Accordingly, the thermoplastic resin solution is dispersed in the aqueous solution to give an emulsion. The conductive agent is maintained in the thermoplastic resin solution, and is not released into the aqueous solution. There is no particular limitation with respect to the type of the organic solvent, so long as it can produce an emulsion.

Examples of the organic solvent include carbonhydrates such as cyclohexane, methylcyclohexane, ethylcyclohexane, pentane, hexane, heptane, octane, toluene, xylene, tetraline, and decaline; chloroform; ketones such as methyl ethyl ketone, methyl propyl ketone, diisobutyl ketone, methyl n-hexyl ketone, and cyclohexanone; esters such as isobutyl acetate and carbitol acetate; ethers such as n-butyl ether and diisopropyl ether; and solvent mixture comprising one or more of these.

The thermosetting resin and the hardening agent may be dispersed or dissolved in the aqueous solution before-hand, of may be dispersed or dissolved after the preparation of the emulsion. In either case, a resin layer material, in which the thermoplastic resin solution is emulsified in the thermosetting resin solution, the thermoplastic resin solution having the thermoplastic resin and the conductive agent dispersed or dissolved in the organic solvent, and the thermosetting resin solution having the thermosetting resin and the hardening agent dispersed or dissolved in water, is obtained.

Next, the resin layer material is applied onto the conductive substrate, followed by baking at 120 to 230° C. By carrying out the baking procedure at such temperature, water and organic solvent will volatize, and the thermosetting resin and the hardening agent would react to harden, thereby providing a current collector as shown in FIG. 1 to FIG. 2. Examples of the baking temperature include 120, 130, 140, 150, 160, 170, 180, 190, 200, 210, 220, and 230° C., and may be in the range of two values selected from the values exemplified herein. In addition, the temperature difference defined as (melting point of resin)–(baking temperature) is preferably −120° C. to 50° C. When the melting point of the resin is too low compared with the baking temperature, the conductive agent would be dispersed into the thermosetting resin base material before the thermosetting resin is hardened, when the baking of the resin layer is carried out. Accordingly, there are cases where the shut down function cannot be appropriately achieved. On the other hand, when the melting point of the resin is too high compared with the baking temperature, the thermoplastic resin and the conductive agent would not fuse even when the baking is carried out, which would result in a condition where the thermoplastic resin and the conductive agent are just placed adjacently to be dispersed in the thermosetting resin base material. Accordingly, there are cases where the shut down function cannot be appropriately achieved. Specific examples of the temperature difference include, −120, −110, −100, −90, −80, −70, −60, −50, −40, −30, −20, −10, 0, 10, 20, 30, 40, and 50, and may be in the range of two values selected from the values exemplified herein. On the other hand, when the temperature difference is appropriate, the conductive agent and the thermoplastic resin would be fused and the conductive agent would be encapsuled in the thermoplastic resin. Accordingly, the shut down can be achieved appropriately.

When coating, a roll coater, a gravure coater, a slit dye coater and the like can be used, and is not limited to these. The baking time is not particularly limited. Here the baking time is 60 to 240 seconds for example.

The method for adjusting the value given by (average thickness of the thermoplastic resin 9)/(average thickness of the thermosetting resin base material 7) is not particularly limited. Here, it can be adjusted by varying the concentration of the thermoplastic resin solution, the concentration of the thermosetting resin solution, and the mixing ratio of the thermoplastic resin solution to the thermosetting resin solution. For example, the concentration of the thermosetting resin solution can be made higher to make the average thickness of the thermosetting resin base material 7 larger, thereby decreasing the value.

3. Electrode Structure

By forming an active material layer or an electrode material layer on at least one side of the current collector of the present invention, the electrode structure of the present invention can be obtained. The electrode structure for the electrical storage device formed with the electrode material layer will be described later. First, in the case of an electrode structure with an active material layer formed thereon, this electrode structure can be used with a separator, non-aqueous electrolyte solution and the like to manufacture an electrode structure (including parts for batteries) for a non-aqueous electrolyte battery, such as a lithium ion secondary battery. In the electrode structure for the non-aqueous electrolyte battery and the non-aqueous electrolyte battery of the present invention, conventional parts for non-aqueous electrolyte battery can be used for the parts other than the current collector.

Here, in the present invention, the active material layer formed as the electrode structure may be the ones conventionally proposed for the non-aqueous electrolyte battery. For example, positive electrode structure of the present invention can be obtained by coating the current collector of the present invention which uses aluminum with a paste, followed by drying. Here, the paste for the positive electrode structure is obtained by using $LiCoO_2$, $LiMnO_2$, $LiNiO_2$ and the like as an active material and using carbon black such as acetylene black and the like as conductive agent, and dispersing the conductive agent and the conductive material in PVDF as a binder or in the water dispersion type PTFE.

The negative electrode structure of the present invention can be obtained by coating an active material layer forming material in the form of a paste, followed by drying. The current collector for the negative electrode of the present invention uses copper. Here, the paste for the negative electrode structure is obtained by using graphite (black lead), graphite, mesocarbon microbead and the like as an active material, dispersing the active material in CMC as a thickening agent, and then mixing the resulting dispersion with SBR as a binder.

4. Non-Aqueous Electrolyte Battery

The present invention may be a non-aqueous electrolyte battery. In such case, there is no particular limitation except that the current collector of the present invention is used. For example, the non-aqueous electrolyte battery of the present invention can be obtained by sandwiching a separator immersed in an electrolyte solution for non-aqueous electrolyte battery containing non-aqueous electrolyte, in between the afore-mentioned positive electrode structure and the negative electrode structure having the current collector of the present invention as a constructing component. As the non-aqueous electrolyte and the separator, the conventional ones for the non-aqueous electrolyte battery can be used. The electrolyte solution can use carbonates, lactones or the like as a solvent. For example, $LiPF_6$ or $LiBF_4$ as an electrolyte can be dissolved in a mixture of EC (ethylene carbonate) and EMC (ethyl methyl carbonate) and used. As the separator, a membrane made of polyolefin having microporous can be used for example.

5. Electrical Storage Device (Electrical Double Layer Capacitor, Lithium Ion Capacitor and the Like)

In general, the electrical double layer capacitor and the like are high in safety compared with the secondary battery. Here, in view of improving the high rate characteristics, the current collector of the present invention can be applied. The current collector of the present invention can be applied to an electrical storage device such as an electrical double layer capacitor, lithium ion capacitor and the like, which require charge and discharge with a large current density at high speed. The electrode structure for the electrical storage device of the present invention can be obtained by forming an electrode material layer on the current collector of the present invention. The electrical storage device such as the electrical double layer capacitor, lithium ion capacitor and the like can be manufactured with the electrode structure thus obtained, a separator, and an electrolyte solution. In the electrode structure and the electrical storage device of the present invention, conventional parts for the electrical double layer capacitor and lithium ion capacitor can be used for the parts other than the current collector.

The electrode material layers of the positive electrode and the negative electrode can both be structured with an electrode material, a conductive agent, and a binder. In the present invention, the electrode structure is obtained by forming the afore-mentioned electrode material layer onto at least one side of the current collector of the present invention, and then the electrical storage device is obtained. Here, as the electrode material, the ones conventionally used as the electrode material for the electrical double layer capacitor or for the lithium ion capacitor, can be used. For example, carbon powders such as activated charcoal and graphite (black lead), and carbon fibers can be used. As the conductive agent, carbon blacks such as acetylene black and the like can be used. As the binder, PVDF (polyvinylidene fluoride) SBR (styrene butadiene rubber), and water dispersion type PTFE can be used for example. In addition, the electrical storage device of the present invention can construct an electrical double layer capacitor or a lithium ion capacitor by fixing a separator in between the electrode structures of the present invention, and then immersing the separator in the electrolyte solution. As the separator, a membrane made of polyolefin having microporous, a non-woven fabric for an electrical double layer capacitor and the like can be used for example. Regarding the electrolyte solution, carbonates and lactones can be used as the solvent for example, and tetraethylammonium salt, triethylmethylammonium salt and the like can be used as the electrolyte, and hexafluorophosphate, tetrafluoroborate and the like can be used as the negative ion. Lithium ion capacitor is structured by combining a negative electrode of a lithium ion battery and a positive electrode of an electrode double layer capacitor. There is no particular limitation with respect to the manufacturing method and known methods can be adopted, except that the current collector of the present invention is used.

EXAMPLES

Hereinafter, the present invention will be described in detail with reference to Examples. However, the Examples are merely an exemplification, and the present invention shall not be limited to these Examples.

The current collectors for Examples and Comparative Examples were prepared in accordance with the following method, and various evaluations were conducted. The conditions for preparation and the results of the evaluation are provided in Table 1 to Table 3.

TABLE 1

| | | | melting point | Example | | | | | | |
|---|---|---|---|---|---|---|---|---|---|---|
| | | | | 1 | 2 | 3 | 4 | 5 | 6 | 7 |
| thermoplastic resin solution (formulation amount: parts by volume) | resin | paraffin | 61 | 100 | | | | | | |
| | | polyethylene | 105 | | 100 | | | | | |
| | | polyethylene-acryl copolymer | 135 | | | 100 | | | | |
| | | polyethylene-vinyl acetate copolymer | 143 | | | | 100 | | | |
| | | polyethylene-polypropylene copolymer | 153 | | | | | 100 | | |
| | | polyvinylidene fluoride | 168 | | | | | | 100 | |
| | | polyvinyl butyral | 176 | | | | | | | 100 |
| | conductive agent | acetylene black | | 50 | 50 | 50 | 50 | 50 | 50 | 50 |
| | | volume %: (conductive agent)/(conductive agent + resin) | | 33 | 33 | 33 | 33 | 33 | 33 | 33 |
| | media volume % | toluene | | 400 | 400 | 400 | 400 | 400 | 400 | 400 |
| | | volume % of conductive agent in solution | | 9 | 9 | 9 | 9 | 9 | 9 | 9 |
| | | volume % of thermoplastic resin in solution | | 18 | 18 | 18 | 18 | 18 | 18 | 18 |
| thermosetting resin solution (formulation amount: parts by volume) | resin | polyacrylic acid-polyacrylic acid ester copolymer | | 100 | 100 | 100 | 100 | 100 | 100 | 100 |
| | hardening agent | trimethoxy methyl melamine | | 40 | | | | | | |
| | | hexamethoxy methyl melamine | | | 25 | | 38 | 15 | 25 | 25 |
| | | blocked urea | | | | 15 | | | | |
| | media volume % | water | | 500 | 800 | 120 | 700 | 500 | 750 | 2500 |
| | | volume % of resin in solution | | 25 | 16 | 53 | 19 | 22 | 17 | 6 |
| formulation amount of thermoplastic resin | | | volume | 100 | 100 | 100 | 100 | 100 | 100 | 75 |
| formulation amount of thermosetting resin | | | volume | 300 | 300 | 300 | 300 | 300 | 300 | 350 |
| emulsion diameter | | | μm | 3 | 3 | 3 | 3 | 3 | 3 | 2 |
| ratio of thermoplastic resin in emulsion | | | volume % | 18 | 18 | 18 | 18 | 18 | 18 | 18 |
| ratio of conductive agent in emulsion | | | volume % | 9 | 9 | 9 | 9 | 9 | 9 | 9 |
| amount of thermoplastic resin in coating solution | | | volume % | 7 | 7 | 7 | 7 | 7 | 7 | 5 |
| amount of thermosetting resin in coating solution | | | volume % | 19 | 12 | 40 | 14 | 16 | 13 | 5 |
| ratio of thermoplastic resin (volume %) | | | | 27 | 37 | 15 | 32 | 30 | 35 | 51 |
| baking temperature of resin layer (° C.) | | | | 160 | 160 | 160 | 160 | 160 | 160 | 160 |
| average thickness of conductive agent C (μm) | | | | 1.6 | 1.6 | 1.6 | 1.6 | 1.6 | 1.6 | 0.9 |
| average thickness of thermoplastic resin B (μm) | | | | 1.3 | 1.3 | 1.3 | 1.3 | 1.3 | 1.3 | 0.5 |
| average thickness of thermosetting resin base material A (μm) | | | | 0.7 | 0.4 | 1.4 | 0.5 | 0.6 | 0.5 | 0.2 |

TABLE 1-continued

|  |  |  | melting point | Example 1 | Example 2 | Example 3 | Example 4 | Example 5 | Example 6 | Example 7 |
|---|---|---|---|---|---|---|---|---|---|---|
| thickness of thermoplastic resin B/thickness of thermosetting resin A |  |  |  | 1.9 | 3.1 | 0.9 | 2.5 | 2.2 | 2.9 | 3.2 |
| thickness of conductive agent C/thickness of thermoplastic resin B |  |  |  | 1.3 | 1.3 | 1.3 | 1.3 | 1.3 | 1.3 | 1.3 |
| electrical characteristic | at ambient temperature | resistance (Ω) |  | 10 | 8 | 12 | 8 | 8 | 14 | 10 |
|  | at elevated temperature | resistance increase starting temperature (° C.) |  | 50 | 110 | 130 | 138 | 150 | 180 | 180 |
|  |  | resistance ratio |  | 100 | 120 | 85 | 90 | 75 | 56 | 85 |
| adhesion property of resin layer (by tape peeling) |  |  |  | A | A | A | A | A | A | B |
| solvent resistance (number of times until change observed) |  |  |  | >20 | >20 | >20 | >20 | 19 | 18 | >20 |

TABLE 2

|  |  |  | melting point | Example 8 | Example 9 | Example 10 | Example 11 | Example 12 | Example 13 | Example 14 | Example 15 | Example 16 | Example 17 |
|---|---|---|---|---|---|---|---|---|---|---|---|---|---|
| thermoplastic resin solution (formulation amount: parts by volume) | resin | paraffin | 61 |  |  |  |  |  |  |  |  |  |  |
|  |  | polyethylene | 105 | 100 | 75 | 100 | 100 | 100 | 100 | 100 | 100 | 100 | 120 |
|  |  | polyethylene-acryl copolymer | 135 |  |  |  |  |  |  |  |  |  |  |
|  |  | polyethylene-vinyl acetate copolymer | 143 |  |  |  |  |  |  |  |  |  |  |
|  |  | polyethylene-polypropylene copolymer | 153 |  |  |  |  |  |  |  |  |  |  |
|  |  | polyvinylidene fluoride | 168 |  |  |  |  |  |  |  |  |  |  |
|  |  | polyvinyl butyral | 176 |  |  |  |  |  |  |  |  |  |  |
|  | conductive agent | acetylene black |  | 100 | 15 | 50 | 50 | 50 | 50 | 50 | 50 | 50 | 50 |
|  |  | volume %: (conductive agent)/(conductive agent + resin) |  | 50 | 17 | 33 | 33 | 33 | 33 | 33 | 33 | 33 | 29 |
|  | media | toluene |  | 400 | 400 | 400 | 400 | 400 | 400 | 400 | 400 | 400 | 400 |
|  | volume % | volume % of conductive agent in solution |  | 17 | 3 | 9 | 9 | 9 | 9 | 9 | 9 | 9 | 9 |
|  |  | volume % of thermoplastic resin in solution |  | 17 | 15 | 18 | 18 | 18 | 18 | 18 | 18 | 18 | 21 |
| thermosetting resin solution (formulation amount: parts by volume) | resin | polyacrylic acid-polyacrylic acid ester copolymer |  | 100 | 100 | 100 | 100 | 100 | 100 | 100 | 100 | 100 | 100 |
|  | hardening agent | trimethoxy methyl melamine |  |  |  |  |  |  |  |  |  |  |  |
|  |  | hexemethoxy methyl melamine blocked urea |  | 30 | 30 | 30 | 30 | 30 | 30 | 30 | 30 | 25 | 25 |
|  | media | water |  | 550 | 1400 | 750 | 700 | 3500 | 150 | 800 | 900 | 800 | 650 |
|  | volume % | volume % of resin in solution |  | 22 | 10 | 17 | 16 | 4 | 51 | 16 | 15 | 18 | 19 |
| formulation amount of thermoplastic resin |  |  | volume | 100 | 80 | 100 | 100 | 75 | 100 | 100 | 100 | 100 | 100 |
| formulation amount of thermosetting resin |  |  | volume | 300 | 300 | 300 | 300 | 400 | 300 | 300 | 300 | 300 | 300 |
| emulsion diameter |  |  | μm | 3 | 2 | 3 | 3 | 2 | 3 | 3 | 3 | 3 | 3 |
| ratio of thermoplastic resin in emulsion |  |  | volume % | 17 | 15 | 18 | 18 | 18 | 18 | 18 | 18 | 18 | 21 |
| ratio of conductive agent in emulsion |  |  | volume % | 17 | 3 | 9 | 9 | 9 | 9 | 9 | 9 | 9 | 9 |
| amount of thermoplastic resin in coating solution |  |  | volume % | 8 | 4 | 7 | 7 | 4 | 7 | 7 | 7 | 7 | 7 |
| amount of thermoplastic resin in coating solution |  |  | volume % | 17 | 8 | 13 | 14 | 4 | 38 | 12 | 11 | 12 | 14 |
| ratio of thermoplastic resin (volume %) |  |  |  | 33 | 33 | 35 | 33 | 55 | 15 | 36 | 38 | 37 | 35 |
| baking temperature of resin layer (° C.) |  |  |  | 160 | 160 | 160 | 160 | 160 | 160 | 160 | 160 | 160 | 160 |
| average thickness of conductive agent C (μm) |  |  |  | 3.0 | 0.4 | 1.6 | 1.6 | 0.7 | 1.6 | 1.6 | 16 | 1.6 | 1.6 |
| average thickness of thermoplastic resin B (μm) |  |  |  | 1.2 | 0.7 | 1.3 | 1.3 | 0.4 | 1.3 | 1.3 | 1.3 | 1.3 | 1.5 |
| average thickness of thermosetting resin base material A (μm) |  |  |  | 0.6 | 0.3 | 0.5 | 0.5 | 0.1 | 1.4 | 0.4 | 0.4 | 0.4 | 0.5 |
| thickness of thermoplastic resin B/thickness of thermosetting resin A |  |  |  | 2.0 | 2.5 | 2.8 | 2.7 | 3.2 | 0.9 | 3.0 | 3.3 | 3.1 | 3.0 |
| thickness of conductive agent C/thickness of thermoplastic resin B |  |  |  | 2.5 | 0.5 | 1.3 | 1.3 | 1.3 | 1.3 | 1.3 | 1.3 | 1.3 | 1.0 |
| electrical characteristic | at ambient temperature | resistance (Ω) |  | 5 | 8 | 7 | 6 | 5 | 12 | 8 | 8 | 8 | 8 |
|  | at elevated temperature | resistance increase starting temperature (° C.) |  | 110 | 110 | 110 | 110 | 110 | 110 | 110 | 110 | 110 | 110 |
|  |  | resistance ratio |  | 85 | 122 | 115 | 100 | 140 | 120 | 120 | 120 | 120 | 120 |
| adhesion property of resin layer (by tape peeling) |  |  |  | B | A | A | B | B | A | A | A | A | A |
| solvent resistance (number of times until change observed) |  |  |  | 19 | >20 | >20 | 18 | 18 | >20 | >20 | >20 | >20 | >20 |

TABLE 3

| | | | melting point | Comparative Example 1 | 2 | 3 | 4 | 5 | 6 | 7 | 8 | 9 | 10 | 11 |
|---|---|---|---|---|---|---|---|---|---|---|---|---|---|---|
| thermoplastic resin solution (formulation amount: parts by volume) | resin | polyethylene | 105 | | | | 100 | 100 | 100 | 100 | 100 | 100 | 450 | 100 |
| | | lanolin | 33 | 100 | | | | | | | | | | |
| | | polyester | 235 | | 100 | 100 | | | | | | | | |
| | conductive agent | acetylene black | | 50 | 50 | 50 | 50 | 50 | 200 | 8 | 100 | 30 | 50 | 100 |
| | | volume % conductive agent/(conductive agent + resin) | | 33 | 33 | 33 | 33 | 33 | 67 | 7 | 50 | 23 | 10 | 50 |
| | media volume % | toluene | | 400 | 400 | 400 | 400 | 500 | 1200 | 400 | 400 | 4000 | 400 | 200 |
| | | volume % conductive agent in solution | | 9 | 9 | 9 | 9 | 8 | 13 | 2 | 17 | 1 | 6 | 25 |
| | | volume % of thermoplastic resin in solution | | 18 | 18 | 18 | 18 | 15 | 7 | 20 | 17 | 2 | 50 | 25 |
| thermosetting resin solution (formulation amount: parts by volume) | resin | polyacrylic acid-polyacrylic acid ester copolymer | | 100 | 100 | 100 | 100 | 100 | 100 | 100 | 100 | 100 | 100 | 100 |
| | hardening agent | Trimethoxy methyl melamine | | | | | | | | | | | | |
| | | hexamethoxy methyl melamine | | 25 | 25 | 25 | 25 | 0 | 30 | 30 | 30 | 30 | 30 | 30 |
| | | blocked urea | | | | | 15 | | | | | | | |
| | media | water | | 500 | 500 | 500 | | 500 | 500 | 500 | 400 | 500 | 500 | 150 |
| | | toluene | | | | | 500 | | | | | | | |
| | volume % | volume % of resin in solution | | 23 | 23 | 46 | 23 | 19 | 24 | 24 | 24 | 24 | 24 | 51 |
| formulation amount of thermoplastic resin | | | volume | 100 | 100 | 100 | 100 | 100 | 100 | 100 | 300 | 100 | 100 | 80 |
| formulation amount of thermosetting resin | | | volume | 300 | 300 | 300 | 300 | 300 | 300 | 300 | 150 | 300 | 300 | 1000 |
| emulsion diameter | | | μm | 3 | 3 | 3 | 3 | 3 | 3 | 3 | 18 | 3 | 3 | 1 |
| ratio of thermoplastic resin in emulsion | | | volume % | 18 | 18 | 18 | 18 | 15 | 7 | 20 | 17 | 2 | 50 | 25 |
| ratio of conductive agent in emulsion | | | volume % | 9 | 9 | 9 | 9 | 8 | 13 | 2 | 17 | 1 | 6 | 25 |
| amount of thermoplastic resin in coating solution | | | volume % | 7 | 7 | 7 | 7 | 6 | 5 | 5 | 22 | 1 | 14 | 4 |
| amount of thermosetting resin in coating solution | | | volume % | 17 | 17 | 20 | 17 | 15 | 18 | 18 | 9 | 18 | 18 | 47 |
| ratio of thermoplastic resin (volume %) | | | | 28 | 28 | 25 | 28 | 28 | 22 | 23 | 70 | 4 | 44 | 7 |
| baking temperature of resin layer (° C.) | | | | 160 | 160 | 270 | 160 | 160 | 160 | 160 | 160 | 160 | 160 | 160 |
| average thickness of conductive agent C (μm) | | | | 1.6 | 1.6 | 1.6 | 1.6 | 1.4 | 2.4 | 0.3 | 108.0 | 0.2 | 1.0 | 0.3 |
| average thickness of thermoplastic resin B (μm) | | | | 0.2 | 1.3 | 1.3 | 0.1 | 1.1 | 0.5 | 1.4 | 43.2 | 0.2 | 3.6 | 0.1 |
| average thickness of thermosetting resin base material A (μm) | | | | 0.7 | 0.6 | 0.7 | 0.6 | 0.5 | 0.6 | 0.6 | 0.3 | 0.6 | 0.6 | 1.7 |
| thickness of thermoplastic resin B/thickness of thermosetting resin A | | | | 0.3 | 2.1 | 1.8 | 0.1 | 2.1 | 0.7 | 2.2 | 128.1 | 0.3 | 5.6 | 0.1 |
| thickness of conductive agent C/thickness of thermoplastic resin B | | | | 8.2 | 1.3 | 1.3 | 32.7 | 1.3 | 5.0 | 0.2 | 2.5 | 1.1 | 0.3 | 2.5 |
| electrical characteristic | at ambient temperature | resistance (Ω) | | 11 | 14 | 20 | 9 | 7 | 5 | 52 | 4 | 56 | 70 | 66 |
| | at elevated temperature | resistance increase starting temperature (° C.) | | — | — | 120 | 120 | 125 | 110 | — | 120 | — | — | 110 |
| | | resistance ratio | | 1 | 1 | 110 | 2 | 120 | 2 | 1 | 105 | 1 | 1 | 2 |
| adhesion property of resin layer (by tape peeling) | | | | A | B | C | A | C | B | A | C | A | B | A |
| solvent resistance (number of times until change observed) | | | | >20 | >20 | 8 | 15 | 4 | 18 | >20 | 6 | >20 | 3 | >20 |

<Preparation of Thermoplastic Resin Solution with Dispersed Conductive Agent (Paraffin or Polyethylene)>

A melt solution obtained by heating and melting paraffin or polyethylene was agitated using Disper at the rotation number of 3000. To this melt solution, acetylene black was added with the addition speed of 0.1 g/min to prepare a melt solution having the conductive agent dispersed. Subsequently, the melt solution thus obtained was extruded from a hole having a diameter of 0.1 μm with the speed of 1 g/min, into an organic solvent (toluene) agitated using Disper at the rotation number of 3000. Accordingly, the thermoplastic resin solution containing the conductive agent was prepared.

<Preparation of Thermoplastic Resin Solution with Dispersed Conductive Agent (Other than Paraffin and Polyethylene)>

An organic solvent (toluene) solution of various resins other than paraffin and polyethylene (1 L) was agitated using Disper at the rotation number of 3000, followed by the addition of acetylene black at the addition speed of approximately 1 g/min, to prepare the thermoplastic resin solution.

<Preparation of Resin Layer Material>

The thermosetting resin solution having a nonionic surfactant (HLB 9.5, 3000 ppm), the thermosetting resin, and the hardening agent dissolved or dispersed in water was agitated using Disper at the rotation number of 3000. To this solution, the thermoplastic resin solution was added and mixed at the rate of 0.1 L/min to prepare the resin layer material. In Comparative Example 4, organic solvent (toluene) was used in place of water.

<Preparation of Current Collector>

The resin layer material conductive agent was applied on both sides of an aluminum foil having the thickness of 20 μm (JIS A1085) using a bar coater, followed by drying and baking in air heating furnace. Accordingly, the sample of the current collector was prepared. Baking was carried out under air atmosphere, with wind velocity of 1 to 3 m/sec, setting the atmosphere temperature to 160° C., and allowing the current collectors to stand in the furnace for 120 seconds.

<Average Thickness of Conductive Agent>

The average thickness of the conductive agent was obtained in the following manner. Using an image obtained by SEM observation of the cross section of the resin layer, the length in the vertical direction with respect to the resin layer surface was measured for 10 points where the conductive agent was aggregated continuously from the conductive substrate to the surface of the resin layer. Then, the average of the length measured for the 10 points was calculated.

<Measurement of Average Thickness of Resin Layer, Average Thickness of Thermoplastic Resin>

The thickness of the resin layer was measured by FE-SEM observation of the cross section of the resin layer. The average thickness of the thermosetting resin base material was obtained as the average value of the thickness measured for 20 points where the thermoplastic resin does not exist. In addition, the average thickness of the thermoplastic resin was obtained as the average value of the thickness measured for 30 points in the direction of the thickness of the resin (vertical direction with respect to the aluminum foil surface). Each of the arrows identified with A to C shows the thickness of the thermosetting resin base material, thermoplastic resin, and conductive agent, respectively.

<Electrical Resistance of Resin Layer>

The samples were heated to temperatures ranging from 20° C., elevated by 10 degrees. At each temperature, the sample was sandwiched with gold-plated electrodes, and then the DC amperage at constant voltage was measured to obtain the resistance at each of the electrode temperature. The lowest temperature at which the resistance starts to elevate was taken as the temperature at which the resistance starts to increase (resistance increase starting temperature). In addition, the value obtained by dividing the maximum resistance value with the resistance value at 20° C. was taken as the resistance ratio.

<Measurement of Adhesion Property>

An insulating polyester tape (NP-T tape available from Nitto Denko Corporation) having a width of 10 mm was adhered onto the surface of the sample, and was firmly adhered by pressing with hand. Subsequently, the tape was peeled off at once with a large force, and the peeled-off surface was observed.

A: No change observed on the resin layer.
B: Only the surface layer of the resin layer was peeled off, or the conductive agent was adhered on the surface of the peeled off tape.
C: The resin layer was partly or entirely peeled off from the aluminum surface.

<Measurement of Solvent Resistance>

The sample was immersed in NMP solution for 60 seconds at ambient temperature. The sample was taken out from the NMP solution, and then the NMP remaining on the surface was wiped off quickly. Scratch test was carried out immediately after. A 2-pond hammer with 10-fold gauze was reciprocated, and the times of reciprocation until change was observed in the resin layer (decolorization, peel off, decrease in resin thickness) were counted. The maximum times of reciprocation were 20.

<Discussion>

All of the Examples had low electrical resistance at ambient temperature, and the electrical resistance rose as the temperature was elevated. Accordingly, the shut down function was appropriately achieved. In addition, adhesion property and solvent resistance were also superior.

In Comparative Example 1, the conductive agent was dispersed into the thermosetting resin base material before the hardening of the thermosetting resin when the resin layer was baked, due to the extremely low melting point of the thermoplastic resin. Accordingly, the shut down function was not appropriately achieved.

In Comparative Example 2, the thermoplastic resin and the conductive agent were not fused, resulting in a condition where the thermoplastic resin and the conductive agent are just placed adjacently to be dispersed in the thermosetting resin base material, since the baking temperature was by far lower than the melting point of the thermoplastic resin. Therefore, the conductive agent would not apart even when the thermoplastic resin expanded, and thus the shut down function was not appropriately achieved.

In Comparative Example 3, the thermosetting resin base material was decomposed due to the extremely high baking temperature of the resin layer. Accordingly, the adhesion property of the resin layer and the solvent resistance decreased.

In Comparative Example 4, the thermosetting resin solution was prepared using an organic solvent, resulting in dispersion of the thermoplastic resin and the conductive agent into the thermosetting resin base material. Accordingly, electrical conductivity was maintained even at elevated temperature, and thus the shut down function was not appropriately achieved.

In Comparative Example 5, the entirety of the resin layer was thermoplastic resin-based, since the hardening agent was not contained in the thermosetting resin solution. Accordingly, the resin layer was easily imbibed by the solvent contained in the active material paste, resulting in decrease in the adhesion property and decrease in the solvent resistance.

In Comparative Example 6, the contact between the conductive agent was maintained even at elevated temperature due to the excess formulation amount of the conductive agent. Accordingly, the shut down function was not appropriately achieved.

In Comparative Example 7, the number of contacting points of the conductive agent was small due to the excessively small formulation amount of the conductive agent. Accordingly, the electrical resistance at ambient temperature was high.

In Comparative Example 8, the thickness of the thermoplastic resin to the thickness of the thermosetting resin was large, due to the excess formulation amount of the thermoplastic resin to the thermosetting resin. Accordingly, the thermosetting resin could not maintain the thermoplastic resin, resulting in inferior solvent resistance.

In Comparative Example 9, the thermoplastic resin was embedded in the thermosetting resin, since the thickness of the thermoplastic resin to the thickness of the thermosetting resin was small. Accordingly, the active material and the thermoplastic resin hardly came in contact with each other, resulting in less conductive pathway. Therefore, the electrical resistance at ambient temperature was high.

In Comparative Example 10, the conductive agent was thin, since the formulation amount of the thermoplastic resin to the conductive agent was large. Accordingly, the electrical resistance at ambient temperature was high. In addition, the thermoplastic resin was thick, since the formulation amount of the thermoplastic resin to the thermosetting resin was excessively large. Accordingly, the thermoplastic resin was prone to detachment, resulting in inferior solvent resistance.

In Comparative Example 11, the conductive pathway was less, since the formulation amount of the thermoplastic resin was small. Accordingly, the electrical resistance at ambient temperature was high.

EXPLANATION OF SYMBOLS

1: current collector
3: conductive substrate
5: resin layer (resin layer for current collector)
7: thermosetting resin base material
9: thermoplastic resin
11: conductive agent
15: active material layer or electrode material layer
17: electrode structure

The invention claimed is:

1. A current collector having a resin layer on at least one side of a conductive substrate, wherein:
    the resin layer has a thermoplastic resin dispersed in a thermosetting resin base material, the thermoplastic resin encapsuling at least a part of a conductive agent;
    the thermosetting resin base material is formed with a composition comprising a thermosetting resin and a hardening agent;
    the conductive agent is substantially dispersed only in the thermoplastic resin;
    a value given by (average thickness of the conductive agent)/(average thickness of the thermoplastic resin) is 0.5 to 3;
    the conductive agent is formulated so that a value of volume % given by (the conductive agent)/(the conductive agent+the thermoplastic resin) is 10% to 50%; and
    formulation ratio of the thermoplastic resin is 10% to 65 volume %, wherein the formulation ratio is given by the formula: (volume of the thermoplastic resin+volume of the conductive agent)/(volume of the thermoplastic resin+volume of the conductive agent+volume of the thermosetting resin+volume of the hardening agent).

2. The current collector of claim 1, wherein the thermoplastic resin has a melting point of 50° C. or higher and 200° C. or lower.

3. The current collector of claim 1, wherein a value given by (average thickness of the thermoplastic resin)/(average thickness of the thermosetting resin base material) is 0.9 to 3.5.

4. The current collector of claim 1, wherein the thermoplastic resin is at least one selected from the group consisting of a polyethylene-based resin, a polypropylene-based resin, a polyvinylidene fluoride-based resin, a polyvinyl butyral-based resin, and modified resins thereof.

5. The current collector of claim 1, wherein the conductive agent comprises carbon black.

6. The current collector of claim 1, wherein:
    the thermosetting resin is a mixture or a copolymer comprising at least one type selected from the group consisting of a polyacrylic acid-based resin, a nitrocellulose-based resin, and a chitosan-based resin.

7. An electrode structure comprising an active material layer or an electrode material layer on the resin layer of the current collector of claim 1.

8. A non-aqueous electrolyte battery or an electrical storage device comprising the electrode structure of claim 7.

9. A method for manufacturing a current collector according to claim 1, the method comprising the steps of:
    applying a resin layer material on at least one side of a conductive substrate; and
    baking the resin layer material at 120° C. to 230° C.;
    wherein
    the resin layer material is obtained by emulsifying a thermoplastic resin solution in a thermosetting resin solution, the thermoplastic resin solution having a thermoplastic resin and a conductive agent dispersed or dissolved in an organic solvent, and the thermosetting resin solution having a thermosetting resin and a hardening agent dispersed or dissolved in water.

* * * * *